CLAYTON E. HUNT JR.
INVENTOR.

BY R. Frank Smith

Lloyd F. Seebach
ATTORNEY & AGENT

Oct. 13, 1959 C. E. HUNT, JR 2,908,755

DEVICE FOR RESTRICTING CHARACTERS TO PREDETERMINED NUMBER IN FACSIMILE APPARATUS

Filed Dec. 23, 1957 6 Sheets-Sheet 2

CLAYTON E HUNT JR.
INVENTOR.

BY R. Frank Smith

Lloyd F. Seebach
ATTORNEY & AGENT

Oct. 13, 1959 C. E. HUNT, JR 2,908,755

DEVICE FOR RESTRICTING CHARACTERS TO PREDETERMINED NUMBER IN FACSIMILE APPARATUS

Filed Dec. 23, 1957 6 Sheets-Sheet 3

CLAYTON E. HUNT JR.
INVENTOR.

BY R. Frank Smith

Lloyd F. Seebach
ATTORNEY & AGENT

Oct. 13, 1959 C. E. HUNT, JR 2,908,755

DEVICE FOR RESTRICTING CHARACTERS TO PREDETERMINED NUMBER IN FACSIMILE APPARATUS

Filed Dec. 23, 1957 6 Sheets-Sheet 4

CLAYTON E. HUNT JR.
INVENTOR.

BY R. Frank Smith

Lloyd F. Seebach
ATTORNEY & AGENT

Oct. 13, 1959 C. E. HUNT, JR 2,908,755
DEVICE FOR RESTRICTING CHARACTERS TO PREDETERMINED NUMBER IN FACSIMILE APPARATUS
Filed Dec. 23, 1957 6 Sheets-Sheet 5

CLAYTON E. HUNT JR.
INVENTOR.
BY R. Frank Smith
Lloyd F. Seebach
ATTORNEY & AGENT

CLAYTON E HUNT JR.
INVENTOR.
BY
ATTORNEY & AGENT

United States Patent Office 2,908,755

Patented Oct. 13, 1959

2,908,755

DEVICE FOR RESTRICTING CHARACTERS TO PREDETERMINED NUMBER IN FACSIMILE APPARATUS

Clayton E. Hunt, Jr., Rochester, N.Y., assignor to Eastman Kodak Company, Rochester, N.Y., a corporation of New Jersey Application December 23, 1957, Serial No. 704,410

8 Claims. (Cl. 178—30)

The present invention relates to facsimile apparatus and more particularly to such apparatus as used for printing address labels from punched cards wherein means is provided to restrict the number of characters to be printed to a predetermined number, when the number of characters is greater than the predetermined number, and to print all of the characters when the number of characters is equal to or less than the predetermined number, this application being a continuation-in-part of my application Serial No. 614,192, filed October 5, 1956.

In U.S. Patent No. Re. 23,713 in the name of C. E. Hunt, Jr., U.S. Patent No. 2,659,652 in the name of Russell G. Thompson and U.S. patent applications Serial No. 394,926 in the names of R. G. Thompson and C. E. Hunt, Jr. and Serial No. 474,169 in the name of C. E. Hunt, Jr., apparatus is described for delivering visual representatives of characters on a medium from code arranged on cards in successive columns and representative of the characters. In such apparatus discrete cards are fed successively from a stack through a sensing station wherein the successive columns of code are analyzed for obtaining signals representative of the code. By circuit means these signals are converted into electrical signals which are utilized to energize either singly or in combination a plurality of recorders for producing a visual representation of the characters on the medium.

As is well known, the Hollerith system or IBM system utilizes a card having eighty vertical columns each with twelve possible code designations. For use in specific applications, a card may be divided into sections, or groups of columns, known as areas or fields which define that portion of the card in which information of a certain kind will always appear. The Remington Rand card has ninety vertical columns each with six possible code positions. The card is divided into an upper and lower section, each section extending across the length of the card to provide forty-five columns and six positions in each section. Each section may also be divided into areas or fields in which certain information will be recorded.

Irrespective of the type of card employed, it is evident that the information punched into these areas will not always correspond to the number of characters which can be printed on an address label. For example, in a name including title, first name, middle initial and surname the number of characters and spaces may exceed the number of spaces available on the label for said characters and spaces. On the other hand, the number of characters and spaces may be equal to or less than the spaces on the label, in which case the complete name could be printed. In the former case, the full name might be printed if it were possible to restrict the title to perhaps a single letter or to restrict the first name to only the first initial. This procedure would also be possible in other instances wherein a large number of cards contain an address in the same state; for example, New York could be restricted to the printing of NY, Pennsylvania to Penn, Rhode Island to RI, etc.

The present invention provides for restricting the printing of a plurality of characters to a number of characters equal to or less than a predetermined number and where the plurality of characters is equal to or less than the predetermined number, all of the characters are then printed. This is accomplished by providing an auxiliary memory which is associated with each memory corresponding to a designated code column. As a card is scanned, each column of perforations or punched-out code provides a group of signals which are representative of and individual to a particular character. The signals from each column of code are read into the associated memory means and if no signal is read in, then a signal is read into the auxiliary memory associated therewith. A ring chain having a unit associated with each memory means is responsive to periodic pulses for causing readout of the signals stored in each memory means and readout of any signal stored in the auxiliary memory. A counter is actuated by each negative signal induced in the output coil of the auxiliary memory by the signal read into the read-in coil and upon reaching a predetermined count provides an output pulse, the predetermined count being determined by the difference between the maximum number of characters and/or spaces that can be encoded on the card in a particular section and the number of characters and/or spaces that can be printed on the label. This count may vary from two to six or even a larger number depending on the number of allocated columns on the card and the label size. A pulse from the counter is indicative of the fact that the number of characters is equal to or less than the predetermined number and, hence, all of the characters are to be printed on the label. If the counter does not deliver a pulse, this is indicative of the fact that a group of the characters is to be restricted to the printing of only one or more of the characters in that particular group. A control circuit associated with the counter and the units of the ring chain corresponding to the group of characters to be restricted normally maintains only those units operative which will permit read-out of the signals for restricted printing, that is, of at least the first character in the group. In response to the counter output pulse, the control circuit renders all of the units operative to permit read-out of all the signals so that all characters in the group are printed. By this arrangement, which is described in more detail hereinafter, a number of characters can be printed which are commensurate to the label.

The primary object of the invention is, therefore, to provide a device for facsimile apparatus in which the printing of a plurality of characters greater than a predetermined number is restricted to a number not greater than the predetermined number and all characters are printed when the number is equal to or less than the predetermined number.

Another object of the invention is to provide a device for facsimile apparatus in which the characters, which are represented by code punched in successive columns and in designated areas of a card, are restricted to a predetermined number of characters when the total number of characters is greater than the predetermined number, and only one of the characters in one of the designated areas is printed, and when the total number of characters is equal to or less than the predetermined number, all of the characters in each designated area are printed.

And still another object of the invention is to provide a device for facsimile apparatus in which the printing of a plurality of characters greater than a predetermined number is restricted to a number not greater than the predetermined number and all characters are printed when the number is equal to or less than the predetermined number, said device including a counter circuit and a control circuit for controlling the read-out of stored electrical signals representative of the characters in accordance with the number of characters to be printed.

Other objects and advantages will be apparent to those skilled in the art by the description which follows:

Reference is now made to the accompanying drawings wherein like reference numerals designate like parts and wherein.

Figures 1, 2, 3:
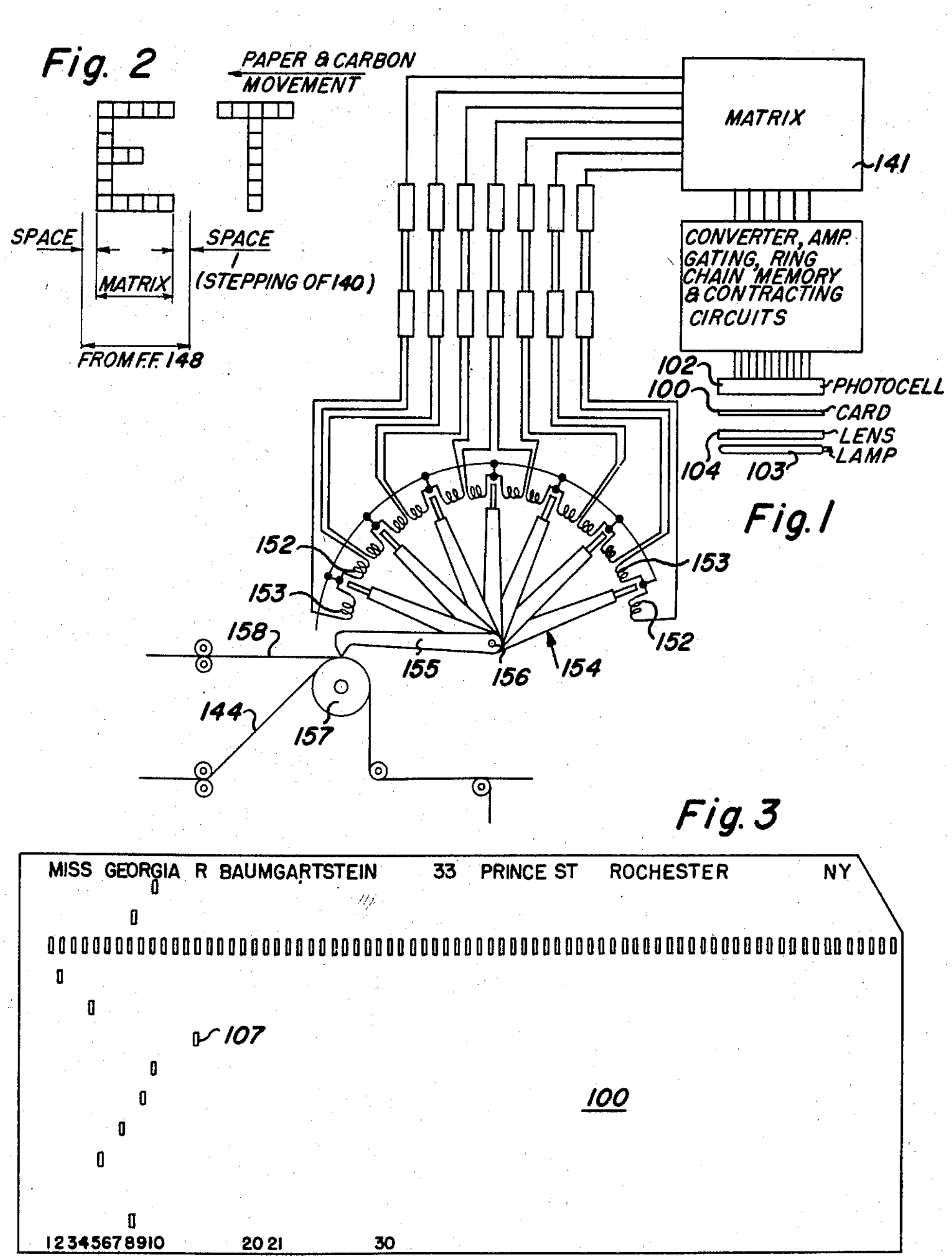
Fig. 1 is a diagrammatic view of the printing apparatus showing the means for deriving the electrical signals from the punched cards and the recording elements actuated by said signals.
Fig. 2 is an enlarged view of two characters as reproduced by said recording elements and showing the formation of said characters from a 5 x 7 dot rectangle.
Fig. 3 is a detail view of a punched card showing the division of the card into areas for each portion of the name and address.

The apparatus to be described for the purpose of disclosing the invention has been designed to record or print all characters with a definition in height of seven lines and with five-line definition in width, see Fig. 2. More or fewer lines may be employed as desired, but it is believed that seven-by-five definition gives the lowest resolving power which can be tolerated when it is desirable to print characters which are easily legible. For printing characters as well as digits, a six element binary code for the coded signals is preferred. These signals may originate in any manner but the invention contemplates their derivation from a medium such as punched tabulating cards. Any other code, of course, may be used as long as it meets the requirement that unique voltage patterns can be derived from each coded character signal.

Card feeding mechanisms for moving cards with respect to a sensing means as well as advancing means for recording tapes or mediums are so well known that a detailed description thereof is deemed to be unnecessary.

Figure 6:
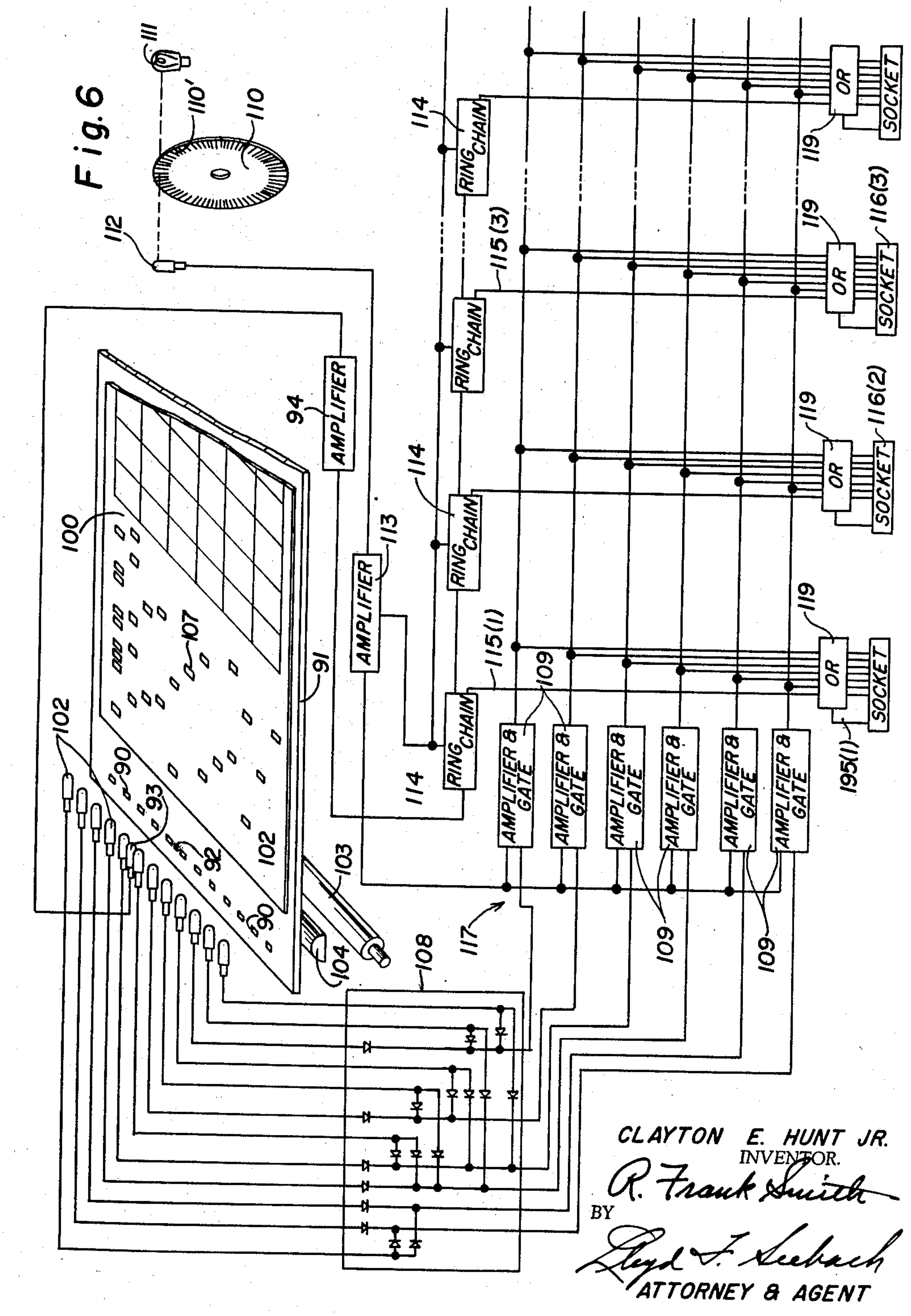
Fig. 6 is a schematic diagram of the apparatus and circuits for receiving and distributing the coded signals derived from the punched cards.

With reference to Figs. 1, 3 and 6, the punched card 100 is divided into areas or fields in which the title, first name, middle initial, surname, etc., appear in successively coded columns by perforating the card in a well-known manner. Cards 100 are fed from the bottom of a stack in a lengthwise direction and at a constant speed into a scanning station 101. For the type of card shown, a group of light-responsive cells 102 are arranged above and across the path of card movement, said group being spaced above the card and aligned with apertures 90 in plate 91 over which cards 100 are moved so that columns of code corresponding to the name, address and city and state can be read successively as the card is moved through the scanning station. Lamp 103 and lens 104 are arranged on the under side of the plate 91 in alignment with apertures 90 and cells 102, lens 104 serving to spread the light from lamps 103 to provide uniform illumination for each column as it is scanned. Since the cards are moved continuously through scanning station 101 and past cells 102, the number of cells 102 energized in each row will vary with the code permitting light to be transmitted through apertures 90 and will provide signals which are individual to the character represented by the code. Also, since the printing of the lines on the address label 106 occur simultaneously, the description which is to be given with respect to the first line is to be understood as also being applicable to the other two lines. Although a single set of cells 102 is utilized for reading the code columns on the entire card, each area of the card is associated with a memory and printer for the respective line on the address label. As a result, the code for each area is read successively into the memories but on read-out, the signals stored in each memory are read out simultaneously.

As shown in Fig. 6, the pulses obtained by light transmitted through apertures 107 in cards 100 and onto cell 102 are directed to a conventional circuit 108 of diodes which converts the pulses for each column of code to pulses representative of a binary-six code which, in turn, are delivered to the corresponding amplifier and gating circuits 109, which can be of the Rossi type shown in the text "High Speed Computing Devices" published by McGraw-Hill Book Company. In order to insure synchronization of the card feed and the successive scanning of the columns of code on card 100, a disc 110 is provided with a number of radial slots 110' equivalent in number to the number of columns on the card in each area and is geared or directly connected to the card feed. A light source 111 is arranged on one side of the disc 110 and a light responsive cell 112 on the other side thereof. The light transmitted through slots 110' and falling on cell 112 provides a signal which is utilized as a synchronizing signal for each card column passing the rows of cells 102. The signals from cell 112 are delivered to amplifier 113 which, in turn, delivers the amplified signal to each of amplifier and gating circuits 109. As shown in Fig. 6, the circuits 108 and 109 are common to each column on card 100 but are shown only in conjunction with the first few columns of card 100 associated with the first line on the address label; however, circuits 109 are connected to each of the other card columns. Each signal from amplifier 113, is therefore, connected to each of circuits 109. The signals from amplifier 113 are also directed to ring chains 114 which are equivalent in number to the number of code columns on card 100 and have the property of being stepped along by the signal from amplifier 113 so that output pulses are delivered successively to leads 115 connected to sockets 116, each of sockets 116 corresponding to a code column on the card. In an arrangement, as shown in Fig. 6, the code columns on the card are scanned or sensed and each signal or group of signals derived from a column will be stepped by the single disc 110 and ring chain 114 to its respective socket 116.

The code distribution means or circuit 117 receives a start signal when a card is in a predetermined relation to scanning station 101, that is, at a time when the last column of code in the preceding card is past cells 102 and the first column of code in the next and succeeding card is approaching cells 102. This is accomplished by providing an aperture 92 in plate 91 which is arranged between any two of apertures 90. Aperture 92 is then covered and uncovered by the leading and trailing edges of each card moved through reading station 101. A light responsive cell 93 is aligned with aperture 92 and provides a signal which is delivered to ring chain 114(1) as a start signal by amplifier 94. Cells 102 derive a single or a group of signals from the perforations in each code column as the card passes thereunder and these signals which are based on the IBM system are converted by circuit 108 into a binary-six group of signals. The signals from circuit 108 are amplified and gated with the disc signal to insure exact synchronization and are delivered to socket 116. As a result, an electrical signal representative of the character coded in each column of card 100 is posted on one or more of the terminals of each socket 116 successively. Since each character or digit will be represented by the energization of a different combination of cells 102 associated with each section of card 100, the signals will be applied to the terminals on sockets 116 corresponding to the converted combination of said cells.

Figure 7:
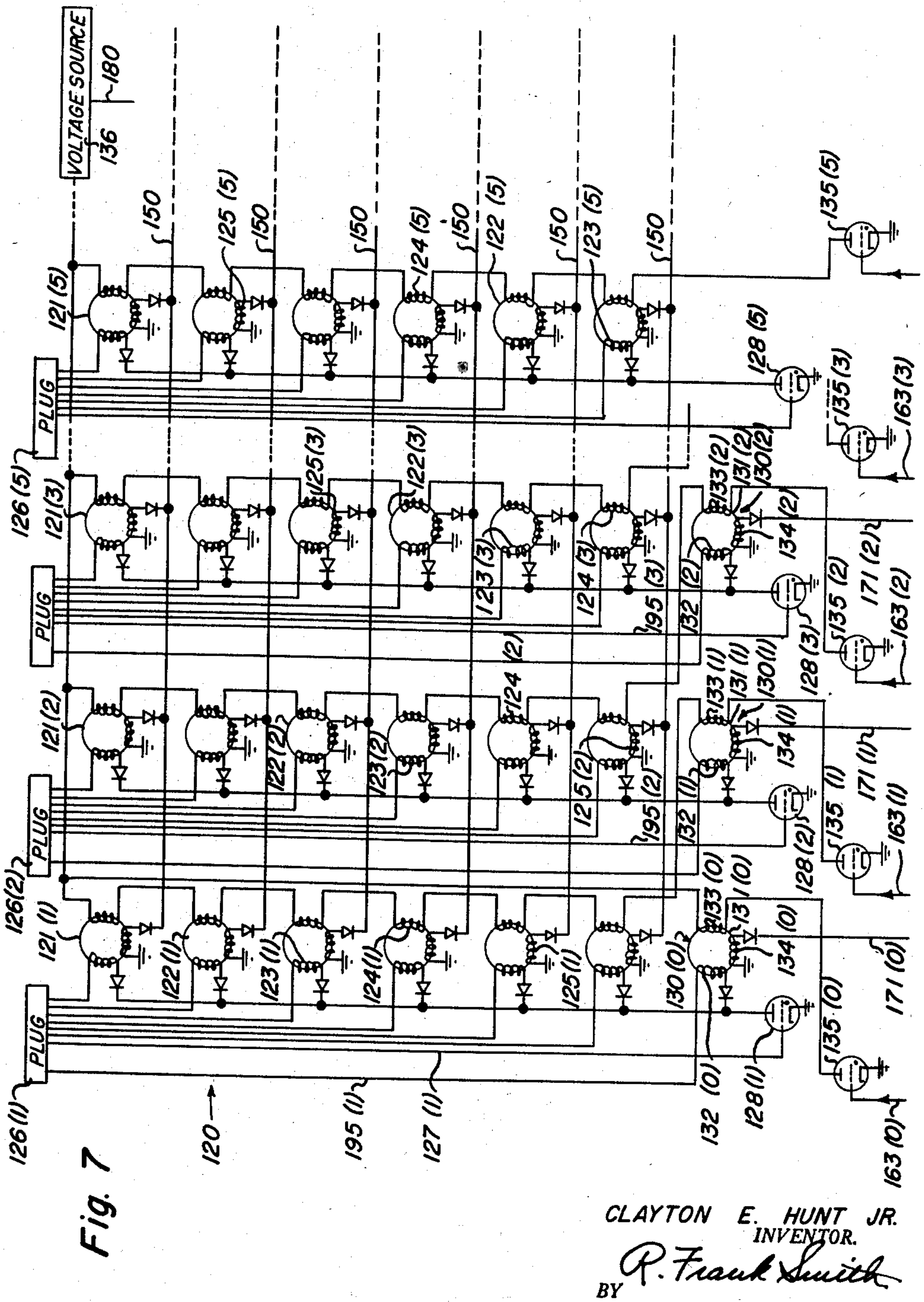
Fig. 7 is a schematic view of a portion of the circuits comprising the memory system.
Figures 10, 11:
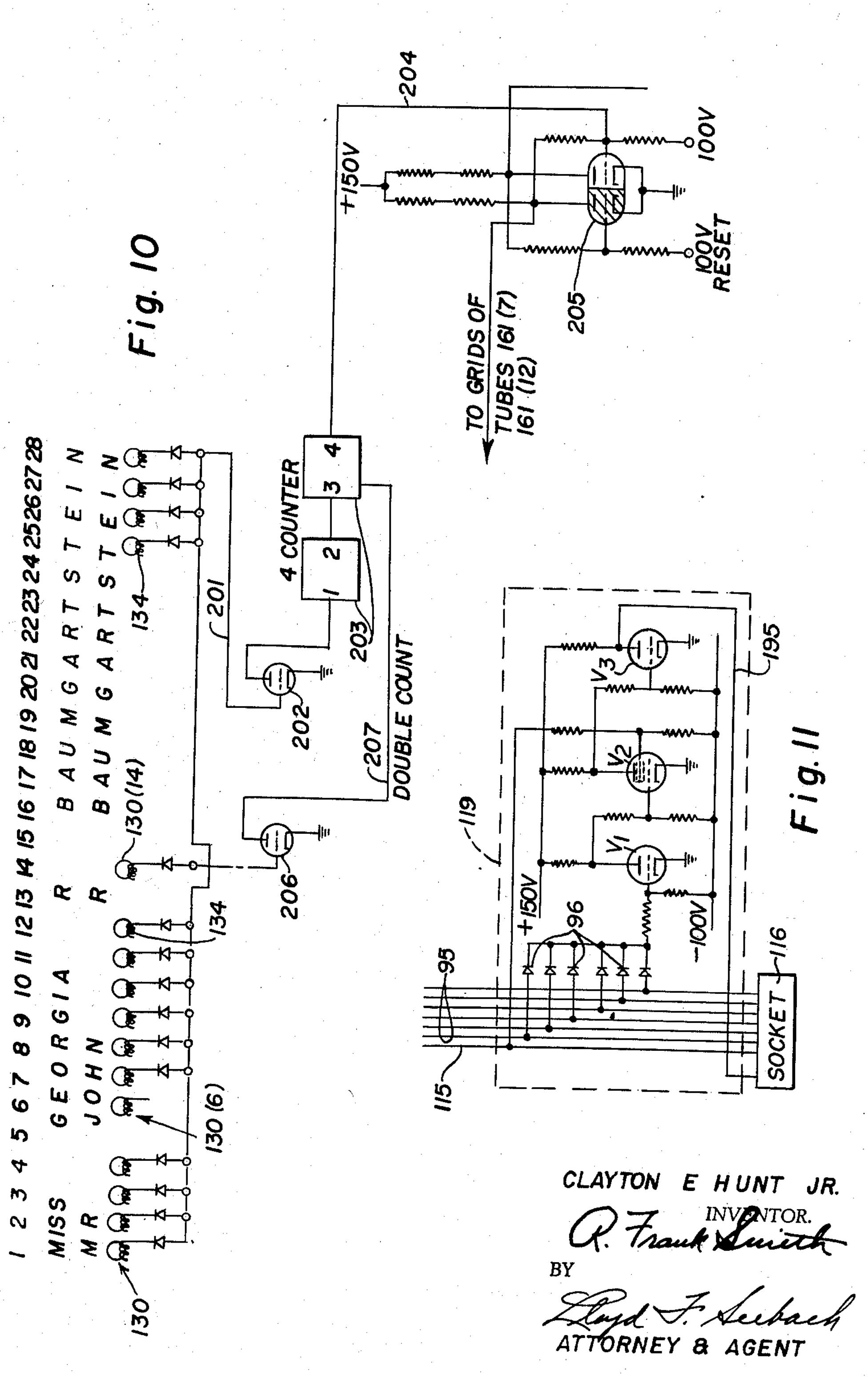
Fig. 10 is a schematic diagram of the means associated with auxiliary memory and the ring chain for controlling the number of characters to be printed.
Fig. 11 is a detail circuit diagram of one of the circuits associated with the distribution means.

Memory means 120, as shown in Fig. 7, comprises a plurality of static magnetic memory units 121 having cores 122, read-in coils 123, read-out coils 124 and output coils 125. Each of the units is arranged in assemblies or groups of six units in accordance with the number of bits in the binary code and each group is associated with one of the code column on card 100, the number of groups being equivalent to the number of code columns in each section. Each memory unit has the property that a pulse in coil 123 will magnetize core 122 in one direction and a pulse in coil 124 will magnetize the core in the opposite direction, coil 125 having an output only when the direction of magnetization is reversed. With reference to Fig. 6, it will be noted that an Or circuit 119, see Fig. 11, is provided between each of sockets 116 and circuit 117. The sockets 116 are engaged by plugs 126 and coils 123 are connected thereto for receiving any signal delivered to its respective terminal on socket 116 and lines 127 are connected in each instance to the control grid of thyratrons 128.

Or circuit 119, as shown in Fig. 11, comprises tubes V1, V2 and V3 which are interconnected to the output lines of circuits 109 and ring chain 114. Signals appear on one or a combination of lines 95 in accordance with the character read and no signal appears when a code column is unpunched, thereby indicating no character in that particular column. A synchronizing signal derived from ring chain 114 appears on line 115 in coincidence with signals on any one or more of lines 95, if any. If a signal appears on any one or more of lines 95, such signal or signals will be transmitted by diodes 96 to render tube VI conducting. The output from tube VI will then be a negative pulse applied to one grid of the dual control tube V2 to render it nonconducting regardless of the synchronizing signal applied to the other grid via line 115. Thus, there is no output to tube V3 and no signal is applied to auxiliary memory read-in coil 132. If none of lines 95 contains a signal, thereby indicating absence of a character in that particular code column, VI is held nonconducting and its output holds one grid of tube V2 in a conducting position. A signal on line 115 therefor renders the other grid conducting to permit tube V2 to conduct and apply a negative pulse to the grid of tube V3 which inverts the pulse to apply a positive pulse to auxiliary memory read-in coil 132. Although such a circuit is shown in conjunction with each of ring chains 114 corresponding to a code column, a single Or circuit 119 can be utilized in a manner similar to circuits 109.

An auxiliary memory means 130 comprising a core 131, read-in coil 132, read-out coil 133 and an output coil 134 is associated with each group of memory units 121 into which a signal may possibly be read. The read-in coil 132 has one side thereof connected to Or circuit 119 via plug 126 and socket 116 and the other side connected to the anode of thyratron 128. Read-out coil 133 is serially connected with the read-out coils 124 associated with its respective memory unit, the anode of thyratron 135 and voltage source 136. Output coils 134 have one side thereof connected by line 171 to the grid of control tube 138, see Fig. 8. As shown schematically in Fig. 5, each of auxiliary memories 130 is associated with a unit of memory means 121 and a unit of a second ring chain 140 which controls the read-out of any signals stored in the memory units.

Figure 9:
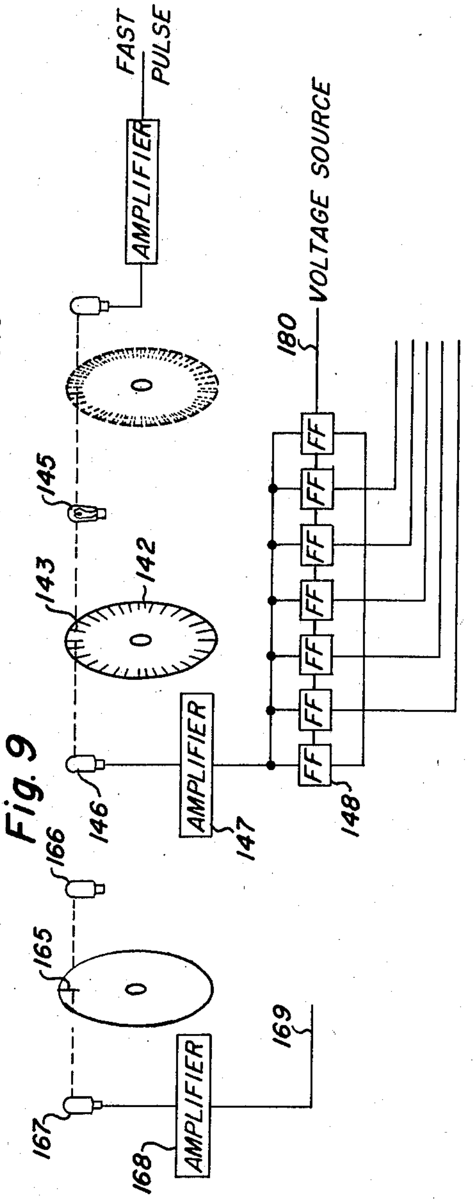
Fig. 9 is a detail view of the means for providing the periodic pulses to the ring chain shown in Fig. 8.

Fig. 9 discloses means for providing periodic pulses to ring chain 140 and to matrix 141, as described hereinafter. A revolving disc 142 which is provided with slots 143 and synchronized with the movement of tape 144 in the printer has a light source 145 arranged on one side thereof and a light responsive cell 146 on the other side, the cell 146 being energized by the light transmitted through the slots. The synchronization is such that for each character seven pulses are delivered by cell 146. These pulses are amplified by circuit 147 and delivered to ring chain 140 by means of seven flip-flop circuits 148 which are connected so that pulses are sent from each in turn. Flip-flop circuits 148 are substantially the same as the units of ring chain 140 disclosed in Fig. 8, and differ only in number, that is, circuit 148 comprises seven units whereas ring chain 140 has twenty-seven units. Five of these pulses are utilized to sequentially operate the printer and the seventh is utilized to step ring chain 140 once for every seven pulses and to pulse the voltage source 136, also note Fig. 2. Since each unit of chain 140 is connected to the control grid of its respective thyratron 135, energization of read-out coils 124 is also controled by ring chain 140.

If for each column scanned, signals are delivered into one or more of read-in coils 123 of each group and read-out coils 124 are pulses at any time thereafter, a signal is induced in each output coil 125 of the unit in which the direction of magnetization has been changed by the read-in coils. As a result, an electrical signal is applied to the respective common output leads 150. The delivery of a signal to any one of read-in coils 123 in a group blocks Or circuit 119 and no signal is delivered thereby to the auxiliary memory 130 associated with the memory group of the next code column. If any of read-in coils 123 are not pulsed by a signal from distribution circuit 117 and read-out coils 124 are pulsed later, no signals will be induced in the output coils of such groups. Successive groups of signals corresponding and individual to the characters to be printed are, therefore, sent out over lines 150.

The signals on output leads 150 are delivered to a group of flip-flop circuits which, in turn, deliver signals to a decoding circuit, then to a synthesizing circuit and to a matrix circuit 141, see Fig. 1. The signals delivered by the matrix 141 are delivered to coils 152 and 153 of magnetic driver 154 to actuate a plurality of styli 155 which are pivotally mounted on a common axis at 156 for movement either singly or in combination toward platen roll 157. Tape 144 is advanced from a supply source together with carbon paper 158 and then separated beyond platen roll 157. For a more detailed description of the apparatus described, reference can be made to the above-mentioned patents and patent application.

Figure 8:
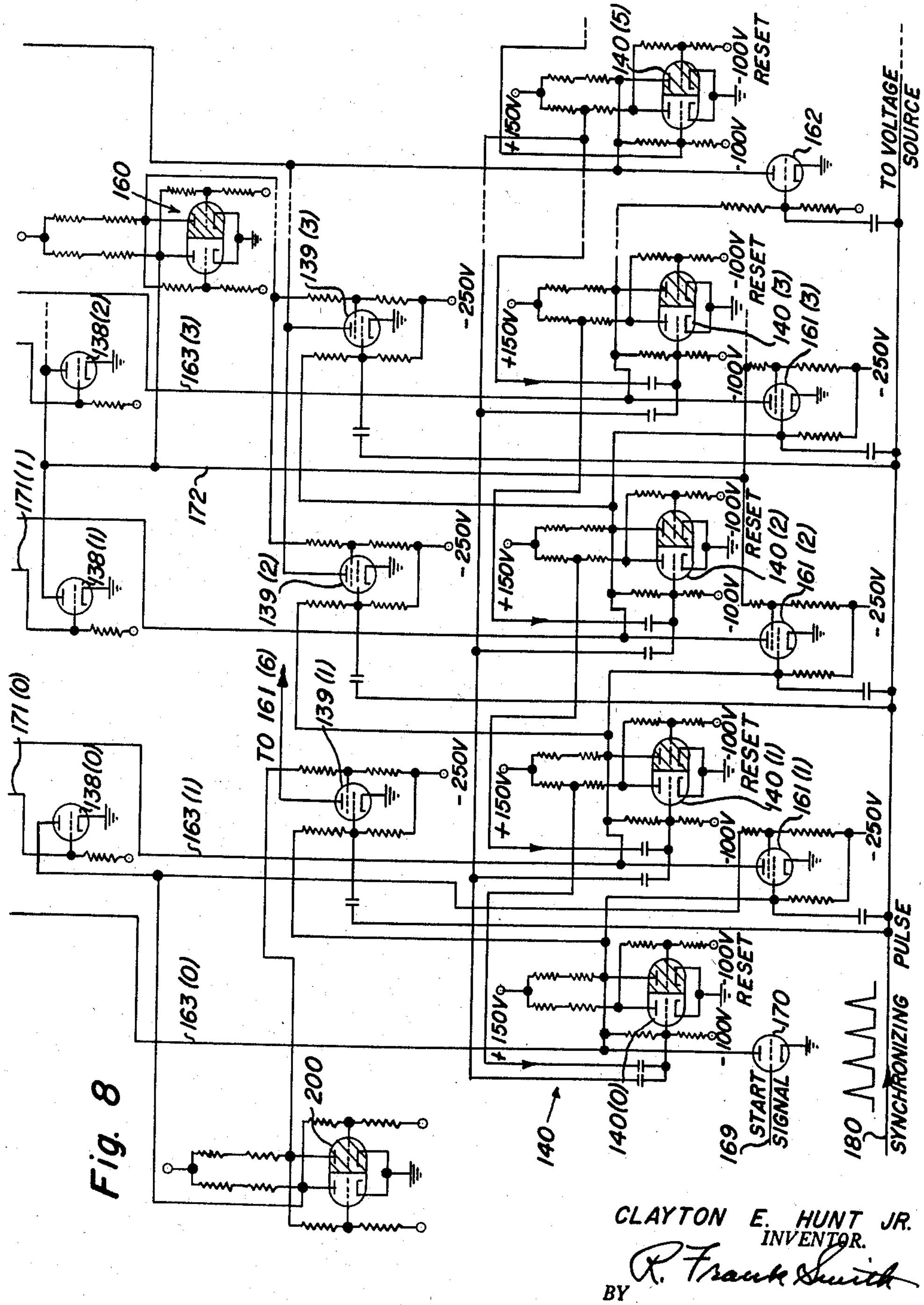
Fig. 8 is a circuit diagram of a number of units of the ring chain for read-out of the signals stored in the memory system.

With respect to Fig. 8, ring chain 140 comprises a number of flip-flop circuits 140(0), 140(1), etc., which are normally conducting on the right hand side. Associated with these circuits are control tubes 138(0), 138(1), etc., control tubes 139(0), 139(1), etc., and a flip-flop circuit 160 which is also conducting on the right-hand side. The circuits disclosed in Fig. 8, show the arrangement and interconnections required for providing a predetermined spacing, in this instance a space equivalent to one character, between the last character in the title and the first character in the first name, the operation being more fully described hereinafter. It is to be understood that this same arrangement can be used between the other groups of characters in the other sections of card 100 in the same way.

If it is assumed that an eighty column card is to be used, that the cards are moved with the equivalent of the space between two code columns between successive cards, and that the card is to be divided into three sections, then each section can comprise twenty-five columns of code and each section will be separated by two columns in which no code will appear, the distribution of columns being other than this if desired. The number of units in ring chain 114 will number eighty-two and the number of units in ring chain 140 will number twenty-seven in accordance with the number of character spaces between successive perforations in tape 144. Ring chain 114 is, therefore, associated with the number of code columns on card 100 and ring chain 140 is associated with the number of character spaces on the label, a maximum of twenty-four characters being capable of being printed on such label.

Figure 4:
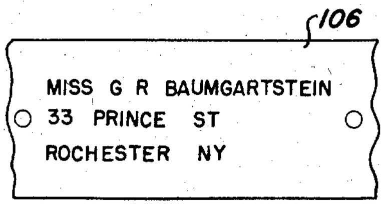
Fig. 4 is a detail view of an address label as printed in accordance with the invention.

As just described above, label 106 can contain a maximum of twenty-four characters. However, with reference to Figs. 3, 5 and 10, it will be noted that the name on card 100 which will be printed on the first line of the label contains twenty-eight characters and spaces, in this instance, the name section having more than twenty-five columns allocated thereto. Since only twenty-four characters and spaces can be printed on the label, it is evident that the last four characters of the last name cannot be printed. As a result, the invention, as described hereinafter, provides for printing only the first letter of the first name and the resulting label 106 is then printed with the title, first initial, middle initial and last name, as shown in Fig. 4. Also, in an instance where the title comprises four characters, such as Miss there is no need for contracting the space between the title and the first initial to a single space inasmuch as this is already provided for by memory group 121(5). In this same instance, there will also be no need for determining whether read-out of memories 121 should commence with 121(1) or 121(6) because a title is present. On cards having a one, two or three character title punched in, control tubes 138 and 139 and flip-flop circuit 160 provide the control means for establishing the predetermined spacing and the operation thereof is more fully described in my copending application Serial No. 704,471 filed December 23, 1957. This same application also describes the manner in which the control tubes 138 and 139 together with flip-flop circuit 200 determine whether read-out of memories 121 should commence with 121(1) or 121(6).

As described above, the leading edge of the card entering the scanning or sensing station delivers a signal to ring chain 114 to render it operative in timed relation to the read-in of signals for storage in memory 120. The flip-flop units of ring chain 140 are normally conducting on the right-hand side, and the bias on tubes 161 and 162 is such that they are biased far beyond cut-off so that the periodic pulses on line 180 from disc 142 have no effect. The anode of tube 170 is connected by line 163(0) to the control grid of thyratron 135(0) and to the anode of the normally nonconducting side of flip-flop 140(0). The signal delivered to tube 170 as a start signal is derived from disc 164 having a single slot 165 and which is rotated together with disc 142, as shown in Fig. 9. Disc 164 is arranged between light source 166 and photocell 167, the signal being derived from the light transmitted through slot 165 and falling on cell 167. This signal is then amplified by any conventional amplifier circuit 168, and the amplified signal is directed by line 169 to the grid of tube 170. While the number of units in chain 114 and chain 140 are different in number, the time required for each chain to complete its cycle is the same. However, chain 140 cannot start the read-out until after the first character in the last section has been read-in and must be started before the last character in this section has been scanned, by this arrangement read-in and read-out can be occurring at the same time. This delay in read-out is necessary so that all three lines on the label can be printed simultaneously. On the other hand, read-out can also start after the last code column has been scanned and before read-in of the first column of code on the succeeding card. The signal delivered to tube 170 by disc 164 is synchronized so that tape 144 is positioned to receive the first character in proper spaced relation to the perforation in the tape. This is accomplished by starting movement of the tape before read-out of the character signals stored in memory 120 and is described more fully in my above-mentioned patent application.

Figure 5:
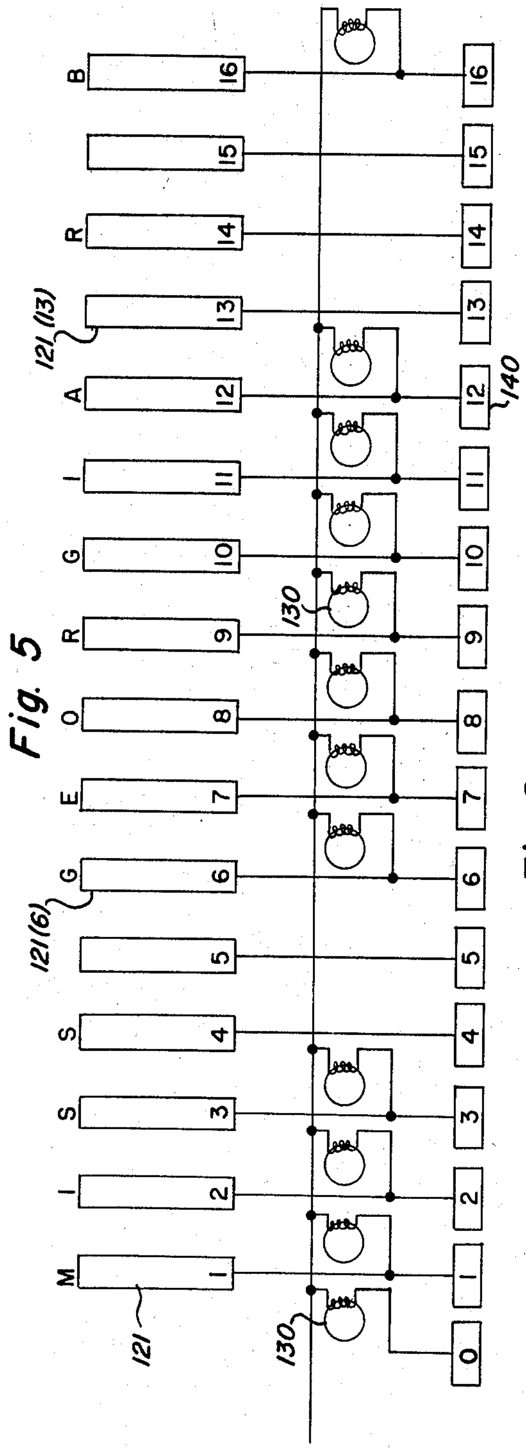
Fig. 5 is a schematic view showing the arrangement of the auxiliary memory with respect to the memory and ring chain units associated with each code column.

Assuming, as shown in Fig. 5, that memories 121(1), 121(2), 121(3) and 121(4) have signals stored therein, the pulse on line 180 to voltage source 136 and which follows the start signal on line 169 causes a pulse to be delivered from said voltage source to read-out coils 124(1) which, in turn, causes the direction of magnetization in any of cores 122(1) in which a signal has been stored by read-in coils 123(1) to be reversed. As a result, the corresponding output coils 125(1) will deliver an electrical signal to the corresponding lines 150. At the same time, the pulse from voltage source 136 will be applied to read-out coils 133(1) of auxiliary memories 130(1). If it is assumed that signals corresponding to M were read into cores 122(1) corresponding thereto and corresponding to I, S and S were read into cores 122(2), 122(3) and 122(4), then Or circuit 119 will not have delivered any signal to any of the auxiliary memories 130(0), 130(1), 130(2) and 130(3). As a result, no signal will be delivered by read-out coils 134(0) of auxiliary memory 130(0) nor will any signal be derived from output coils 134(1), 134(2) and 134(3).

The decrease in plate potential of tube 170 causes the left-hand side of tube 140(0) to become conducting and the right-hand side to become nonconducting. This switching of tube 140(0) causes the bias on tube 161(1) to be reduced to render it receptive to the first pulse on line 180 following the start signal on line 169. This pulse on line 180 is blocked from all of tubes 161 with the exception of tube 161(1) and renders this tube conductive, the reduction in plate potential causing thyratron 135(1) to fire whereby a pulse initiated by the pulse in line 180 causes read-out coils 124(1) to induce signals in output coils 125(1) which are delivered to the lines 150 and correspond to the signals stored in cores 122(1) and which are individual to the character M. The pulse to read-out coils 124(1) is also directed to read-out coil 131(1) of auxiliary memory unit 130(1). Since a character has been read into memory 121(2), that is, for the letter I, Or circuit 119 will not have delivered a signal to read-in coil 132(1). As a result, with the read-out of memory 121(1), no signal is delivered by output coil 134(1) to the grid of control tube 138(1) via line 171(1).

The conduction of tube 161(1) also causes flip-flop circuit 140(1) to switch, this switching rendering tube 161(2) receptive to the second pulse on line 180 and resetting flip-flop 140(0) to its normal condition. The second pulse on line 180 is, therefore, received only by tube 161(2) and renders this tube conductive, flip-flop 140(1) being switched to its normal condition and tube 161(3) being rendered conductive to the third pulse on line 180. Conduction of tube 161(2) renders tube 135(2) conductive whereby read-out coil 131(2) of auxiliary memory 130(2) and read-out coils 124(2) of memory 121(2) are pulsed. The output coils 125(2) then deliver signals corresponding to the letter I to the corresponding lines 150. Since signals have been read into memory 121(3) corresponding to the letter S, Or circuit 119 has not delivered a signal to read-in coil 132(2) of auxiliary memory 130(2). As a result, no signal is induced in output coil 134(2) and the third pulse on line 180 results in read-out memory group 121(3) and auxiliary memory 130(3).

From the drawings, see Figs. 7 and 8, it is evident that flip-flop circuit 160 is connected to both control tubes 139 and 161 so that in the normal state of said circuit control tubes 161 and 162 are responsive to the signals on line 180 and when flip-flop 160 is switched by a signal read-out of any one of auxiliary memories 130, control tubes 139 are operative and tubes 161 are not. Referring to Figs. 5, 7 and 8, as one of flip-flop circuits 140 is switched by a pulse on line 180, the corresponding memory 121 is read out together with the auxiliary memory 130 associated with the next code column. If a signal is stored in the memory next to the one being read-out, flip-flop circuit 160 will not be switched. However, if the next memory unit has no signal stored therein, then Or circuit 119 will have read a signal into the auxiliary memory and circuit 160. The next signal on line 180, is, therefore, directed by tubes 139 to the code column associated with the blank code column between the groups of characters. In the above description, if the title had been Mrs in stead of Miss, there would have been a signal in auxiliary memory 130(3) when memory 121(3) was read out because no signals would have been read into memory 121(4). However, a signal would then have been derived from auxiliary memory 130(3) upon read-out of memory 121(3) and the succeeding pulse would then have been directed to memory 121(5).

A similar arrangement of control tubes 138 and 139 together with a flip-flop circuit 160 is arranged in the same manner with respect to the other groups of characters; such as, first name, surname, number, street, city and state. In each instance, any differences in the number of spaces between the last character in one group and the first character in the next group is always made equivalent to the space of one character. It should be understood, of course, if more than one such space is required or desired, it is merely a matter of adopting the circuitry just described to obtain any desired predetermined spacing.

With reference particularly to Fig. 10, numerals 1–28 indicate the columns on a card 100 in which code is punched corresponding to the characters therebeneath. As described above, each of memory units 121 have an auxiliary memory 130 associated therewith. In Fig. 10 only the auxiliary memories 130 together with their output coils 134 are shown, and it should be noted that auxiliary memory 130(6) is not connected into this circuit for reasons to be set forth hereinafter. Since a signal is read into an auxiliary memory only when there is no signal read into its associated memory 121, such a signal is indicative of a blank space and is supplied by the corresponding Or circuit 119 via line 195 to the respective read-in coil 131. Any such signal provides a negative signal in output coils 134 and is delivered via line 201 to the grid of tube 202, which is normally nonconducting and renders it conductive to supply a pulse to counter 203. Counter 203 can be any well-known type of circuit which is triggered or stepped by each input pulse and which will provide an output pulse with the fourth input pulse because in this instance the difference between the number of name code columns and the label is four, this difference being determined by the number of code columns allocated to the name area, in this instance twenty-eight columns, and the maximum number of twenty-four characters that can be printed on the label. The output pulse from counter 203 is connected via line 204 to the right-hand grip of flip-flop circuit 205 which is normally conducting on the left-hand side.

Since the circuits which are disclosed in Figs. 7 and 8 with respect to card columns 1–5 are utilized in the same manner for the other card columns, these circuits have not been completely disclosed except as shown diagrammatically in Fig. 5. To accomplish the purpose of the invention, flip-flop circuit 205, as shown in Fig. 10, is equivalent to flip-flop circuit 160 shown in Fig. 8 but is normally conducting on the left-hand side instead of the right-hand side. In this way tubes 139(7)—139(12) will be receptive to the proper pulse in line 180 to automatically skip read-out to memory 121(13). Since no auxiliary memory is associated with the sixth code line, the first letter of the first name will always be printed.

As long as counter 203 does not deliver a pulse to the grid of flip-flop circuit 205, read-out of the signals stored in memories 121 will occur as described above. For example, the first four pulses on line 180 will read-out the characters M, I, S and S. The fifth pulse will provide a space because memory 121(5) is not plugged to provide the required space between the four columns allocated to the title and the first name or initial. The sixth pulse will cause read-out of the letter G and since tubes 139(7), 139(8), etc., are conditioned by flip-flop circuit 205, the seventh pulse will automatically be delivered to line 163(13) to provide a space between the first letter of the first name and the middle initial.

If it is now assumed that the title contains only two characters, such as Mr or Dr, that the first name is John, that the middle initial is R, and that the last name remains the same, then the number of characters and spaces will be twenty-three and can be printed in full on the label. In this instance, on read-in of the signals by distribution means 117 to memories 121, Or circuits 119 will provide signals to auxiliary memories 130(3), 130(4), 130(10), 130(11) and 130(12) via the respective read-in coils 132 and negative signals will be derived from the respective output coils 134. Each of these negative signals will cause tube 202 to pulse counter 203 and the fourth pulse, which is derived from auxiliary memory 130(11), will cause counter 203 to emit a pulse which is impressed on the grid of flip-flop circuit 205 and cause it to change conduction from the left to the right-hand side. This places tubes 139(7)—139(12) in a condition, as described above, and read-out of memories 121(6)—121(9) will occur in the normal manner to print the full first name. However, with read-out of memory 121(9) for printing of the letter N, on read-in Or circuit 119 will have delivered a signal to auxiliary memory 130(10) and, as described above, control tube 138(10) will then cause flip-flop circuit 205 to switch to its normal position so that the succeeding or tenth pulse will cause read-out of memory 121(13), which is not plugged, to provide the required space between the N and R in printing of the label.

Since the address area follows the name area on the card and each of these areas is associated with a different address line, a contraction or skip control comprising tubes 138, 139 and a flip-flop circuit is not required between these areas nor between the address area and the city-state area. However, a circuit the same as that comprising tubes 138(0) and 139(0) and flip-flop circuit 200 is necessary to skip read-out from memory 121(14) to memory 121(16) in the event no middle initial is punched into column fourteen on card 100. If no signals are read into memory 121(14), Or circuit 119 will, of course, read a signal into read-in coil 132(14) of auxiliary memory 130(14). The resulting negative signal in output coil 134(14) is impressed on the grid of a second control tube 206 via line 207 and a pulse is delivered to the second stage of counter 205 to provide a double count for the fourteenth and fifteenth columns.

Assuming that the name punched in card 100 is the same as the first name listed in Fig. 10 with the exception of the middle initial R, then on read-in to memory 121(14), Or circuit 119 would provide a signal and the negative signal in auxiliary memory 130(14) would cause a count of two to register in counter 205. However, the full name would still require twenty-six characters and spaces so that the first name would have to be contracted to the first initial. If it is now assumed that the full name is Miss Georgia Baumgar, auxiliary memory 130(14) would result in the first stepping of counter 205 to register a count of two. Auxiliary memories 130(23)

and 130(24) would then provide the next two pulses and with the latter of these pulses, flip-flop circuit 205 would be switched thereby permitting printing of the full name.

In the present invention, therefore, flip-flop circuit 205 normally maintains tubes 139(7)—139(12) receptive to pulses on line 180 so that after read-out of the first character in the first name, the succeeding read-out pulse is skipped to read-out of the memory which is utilized to obtain the required space between the first initial and the middle initial. On the other hand, if a count of four is derived from the Or circuits 119 associated with the memories 121 into which no signals have been read in, then the name in its entirety is printed as coded in card 100. From the foregoing description, it is evident that the circuit comprising tubes 202 and 206 together with counter 203 and flip-flop 205 provides a novel means of control for printing the characters coded in card 100 in several variations and of automatically selecting the variation in accordance with the number of characters comprising the line to be printed. To those skilled in the art, it should also be evident that this same control means can be used to advantage for other sections of the card in which such contractions become necessary due to number of spaces available in the label as compared to the number of code columns allocated to each section on the card. The restricting device may also be utilized to print a plurality of characters in a designated area instead of just a single character. For example, it may be advantageous to restrict the printing in the address line to Av, Dr, Rd etc., when a sufficient number of spaces are not available on the label for the full address or to provide an abbreviation for the state, as mentioned hereinabove.

Having now particularly described my invention what I desire to secure by Letters Patent of the United States and what I claim is:

1. A device for restricting the printing of a plurality of characters greater than a predetermined number to a number of characters not greater than said predetermined number and permitting all of said characters to be printed when the number of characters is equal to and less than said predetermined number, said characters being arranged in groups in adjacent areas of a medium and represented by code arranged in successive columns in each of said areas, comprising means for scanning said medium and delivering output pulses in accordance with the code in each column and individual to the character represented thereby, distribution means for receiving said output pulses and delivering electrical signals representative of the coded character in each of said columns, memory means associated with each code column in each of said areas and connected to said distribution means in a predetermined order for read-out of said electrical signals in said same predetermined order, an auxiliary memory means associated with each of said memory means and only those of each area in which there are to be possible code columns, each of said auxiliary memory means being interconnected to the distribution means associated with the next code column and receiving an electrical signal from said distribution means only when no electrical signal is delivered to its associated memory means, means associated with each of said memory means and said auxiliary memory means for initiating the read-out of said electrical signals successively from said memory means in a predetermined relation to said electrical signals received from said distribution means and the read-out of any electrical signal in said auxiliary memory means, means associated with each of said areas and responsive to the first signal read-out from any one of said auxiliary memory means associated therewith for switching said initiating means to said memory means associated with one of the code columns in the next and adjacent area, control means associated with said auxiliary memory means and the switching means of a predetermined area for maintaining said same switching means operative for read-out by said initiating means of only the electrical signals from said memory means associated with a designated number of code columns of said predetermined area to restrict the total number of characters to not more than said predetermined number, said control means being responsive to the signals read into said auxiliary memory means for counting said signals and, upon reaching a predetermined count indicative that the number of characters on the medium is not more than said predetermined number, providing an output pulse for rendering said switching means of said predetermined area operative to permit said initiating means to read-out all of the electrical signals in said memory means associated with the predetermined area, and means responsive to the electrical signal read-out of said memory means for printing characters in accordance therewith.

2. A device for restricting the printing of a plurality of characters greater than a predetermined number to a number of characters not greater than said predetermined number and permitting all of said characters to be printed when the number of characters is equal to and less than said predetermined number, said characters being arranged in groups in adjacent areas of a medium and represented by code arranged in successive columns in each of said areas, comprising means for scanning said medium and delivering output pulses in accordance with the code in each column and individual to the character represented thereby, distribution means for receiving said output pulses and delivering electrical signals representative of the coded character in each of said columns, memory means associated with each code column in each of said areas and connected to said distribution means in a predetermined order for read-out of said electrical signals in said same predetermined order, an auxiliary memory means associated with each of said memory means and only those of each area in which there are to be possible code columns, each of said auxiliary memory means being interconnected to the distribution means associated with the next code column and receiving an electrical signal from said distribution means only when no electrical signal is delivered to its associated memory means, means associated with each of said memory means and said auxiliary memory means for initiating the read-out of said electrical signals successively from said memory means in a predetermined relation to said electrical signals received from said distribution means and the read-out of any electrical signal in said auxiliary memory means, means associated with each of said areas and responsive to the first signal read-out from any one of said auxiliary memory means associated therewith for switching said initiating means to said memory means associated with one of the code columns in the next and adjacent area, control means associated with said auxiliary memory means and the switching means of a predetermined area for maintaining said same switching means operative for read-out by said initiating means of only the electrical signals from said memory means associated with the first code column of said predetermined area to restrict the total number of characters to not more than said predetermined number, said control means being responsive to the signals read into said auxiliary memory means for counting said signals and, upon reaching a predetermined count indicative that the number of characters on the medium is not more than said predetermined number, providing an output pulse for rendering said switching means of said predetermined area operative to permit said initiating means to read-out all of the electrical signals in said memory means associated with the predetermined area, and means responsive to the electrical signals read-out of said memory means for printing characters in accordance therewith.

3. A device for restricting the printing of a plurality of characters greater than a predetermined number to a number of characters not greater than said predetermined number and permitting all of said characters to be printed when the number of characters is equal to and less than said predetermined number, said characters being arranged in groups in adjacent areas of a medium and represented by code arranged in successive columns in each of said areas, comprising means for scanning said medium and delivering output pulses in accordance with the code in each column and individual to the character represented thereby, distribution means for receiving said output pulses and delivering electrical signals representative of the coded character in each of said columns, memory means associated with each code column in each of said areas and connected to said distribution means in a predetermined order for read-out of said electrical signals in said same predetermined order, an auxiliary memory means associated with each of said memory means and only those of each area in which there are to be possible code columns, each of said auxiliary memory means being interconnected to the distribution means associated with the next code column and receiving an electrical signal from said distribution means only when no electrical signal is delivered to its associated memory means, means associated with each of said memory means and said auxiliary memory means for initiating the read-out of said electrical signals successively from said memory means in a predetermined relation to said electrical signals received from said distribution means and the read-out of any electrical signal in said auxiliary memory means, means associated with each of said areas and responsive to the first signal read-out from any one of said auxiliary memory means associated therewith for switching said initiating means to said memory means associated with one of the code columns in the next and adjacent area, control means associated with said auxiliary memory means and the switching means of a predetermined area for maintaining said same switching means operative for read-out by said initiating means of only the electrical signals from said memory means associated with a designated number of code columns of said predetermined area to restrict the total number of characters to not more than said predetermined number, and means responsive to the electrical signals read-out of said memory means for printing characters in accordance therewith.

4. A device for restricting the printing of a plurality of characters greater than a predetermined number to a number of characters not greater than said predetermined number and permitting all of said characters to be printed when the number of characters is equal to and less than said predetermined number, said characters being arranged in groups in adjacent areas of a medium and represented by code arranged in successive columns in each of said areas, comprising means for scanning said medium and delivering output pulses in accordance with the code in each column and individual to the character represented thereby, distribution means for receiving said output pulses and delivering electrical signals representative of the coded character in each of said columns, memory means associated with each code column in each of said areas and connected to said distribution means in a predetermined order for read-out of said electrical signals in said same predetermined order, an auxiliary memory means associated with each of said memory means and only those of each area in which there are to be possible code columns, each of said auxiliary memory means being interconnected to the distribution means associated with the next code column and receiving an electrical signal from said distribution means only when no electrical signal is delivered to its associated memory means, means associated with each of said memory means and said auxiliary memory means for initiating the read-out of said electrical signals successively from said memory means in a predetermined relation to said electrical signals received from said distribution means and the read-out of any electrical signal in said auxiliary memory means, means associated with each of said areas and responsive to the first signal read-out from any one of said auxiliary memory means associated therewith for switching said initiating means to said memory means associated with one of the code columns in the next and adjacent area, control means associated with said auxiliary memory means and the switching means of a predetermined area for maintaining said same switching means operative for read-out by said initiating means of only the electrical signals from said memory means associated with the first code column of said predetermined area to restrict the total number of characters to not more than said predetermined number, and means responsive to the electrical signals read-out of said memory means for printing characters in accordance therewith.

5. A device for restricting the printing of a plurality of characters greater than a predetermined number to a number of characters not greater than said predetermined number and permitting all of said characters to be printed when the number of characters is equal to and less than said predetermined number, said characters being arranged in groups in adjacent areas of a medium and respresented by code arranged in successive columns in each of said areas, comprising means for scanning said medium and delivering output pulses in accordance with the code in each column and individual to the character represented thereby, distribution means for receiving said output pulses and delivering electrical signals representative of the coded character in each of said columns, memory means associated with each code column in each of said areas and connected to said distribution means in a predetermined order for read-out of said electrical signals in said same predetermined order, an auxiliary memory means associated with each of said memory means and only those of each area in which there are to be possible code columns, each of said auxiliary memory means being interconnected to the distribution means associated with the next code column and receiving an electrical signal from said distribution means only when no electrical signal is delivered to its associated memory means, means associated with each of said memory means and said auxiliary memory means for initiating the read-out of said electrical signals successively from said memory means in a predetermined relation to said electrical signals received from said distribution means and the read-out of any electrical signal in said auxiliary memory means, means associated with each of said areas and responsive to the first signal read-out from any one of said auxiliary memory means associated therewith for switching said initiating means to said memory means associated with one of the code columns in the next and adjacent area, means connected to said auxiliary memory means and responsive to each signal read into said auxiliary memory means for counting said signals and providing an output pulse upon reaching a predetermined count indicative that the number of characters on said medium is not more than said predetermined number, a control circuit associated with the switching means of a predetermined area for maintaining said same switching means operative for read-out by said initiating means of only the electrical signals from said memory means associated with the first code column of said predetermined area to restrict the total number of characters to not more than said predetermined number and responsive to the output signal from said counting means for rendering said same switching means operative to permit said initiating means to read-out all of the electrical signals in said memory means associated with the predetermined area, and means responsive to the electrical signals read-out of said memory means for printing characters in accordance therewith.

6. A device for restricting the printing of a plurality of characters greater than a predetermined number to a number of characters not greater than said predetermined number and permitting all of said characters to be printed when the number of characters is equal to and less than said predetermined number, said characters being arranged in groups in adjacent areas of a medium and represented by code arranged in successive columns in each of said areas, comprising means for scanning said medium and delivering output pulses in accordance with the code in each column and individual to the character represented thereby, distribution means for receiving said output pulses and delivering electrical signals representative of the coded character in each of said columns, memory means associated with each code column in each of said areas and connected to said distribution means in a predetermined order for read-out of said electrical signals in said same predetermined order, an auxiliary memory means associated with each of said memory means and only those of each area in which there are to be possible code columns, each of said auxiliary memory means being interconnected to the distribution means associated with the next code column and receiving an electrical signal from said distribution means only when no electrical signal is delivered to its associated memory means, means associated with each of said memory means and said auxiliary memory means for initiating the read-out of said electrical signals successively from said memory means in a predetermined relation to said electrical signals received from said distribution means and the read-out of any electrical signal in said auxiliary memory means, means associated with each of said areas and responsive to the first signal read-out from any one of said auxiliary memory means associated therewith for switching said initiating means to said memory means associated with one of the code columns in the next and adjacent area, means connected to said auxiliary memory means and responsive to each signal read into said auxiliary memory means for counting said signals and providing an output pulse upon reaching a predetermined count indicative that the number of characters on said medium is not more than said predetermined number, a control circuit associated with the switching means of a predetermined area for maintaining said same switching means operative for read-out by said initiating means of only the electrical signals from said memory means associated with a designated number of code columns in said predetermined area to restrict the total number of characters to not more than said predetermined number and responsive to the output signal from said counting means for rendering said same switching means operative to permit said initiating means to read-out all of the electrical signals in said memory means associated with the predetermined area, and means responsive to the electrical signals read-out of said memory means for printing characters in accordance therewith.

7. A device for restricting the printing of a plurality of characters greater than a predetermined number to a number of characters not greater than said predetermined number and permitting all of said characters to be printed when the number of characters is equal to and less than said predetermined number, said characters being arranged in groups in adjacent areas of a medium and represented by code arranged in successive columns in each of said areas, comprising means for scanning said medium and delivering output pulses in accordance with the code in each column and individual to the character represented thereby, distribution means for receiving said output pulses and delivering electrical signals representative of the coded character in each of said columns, memory means associated with each code column in each of said areas and connected to said distribution means in a predetermined order for read-out of said electrical signals in said same predetermined order, an auxiliary memory means associated with each of said memory means and only those of each area in which there are to be possible code columns, each of said auxiliary memory means being interconnected to the distribution means associated with the next code column and receiving an electrical signal from said distribution means only when no electrical signal is delivered to its associated memory means a ring chain having one unit thereof associated with each of said code columns and successively responsive to periodic pulses for read-out of the electrical signals stored in said memory means, a control tube associated with each of said units for normally blocking its respective unit to said periodic pulses, means for providing periodic pulses to said ring chain and to said memory means for initiating read-out of said electrical signals successively from said memory means in a predetermined relation to said electrical signals received from said distribution means and the read-out of any electrical signal in said auxiliary memory means, means for deriving a signal to initiate the first unit in said ring chain, said units thereafter being initiated successively by said periodic pulses and each unit, upon being initiated, rendering the control tube associated with the following unit receptive to the succeeding pulse and resetting the preceding unit, means for switching said ring chain from any unit in one area to a unit thereof associated with one of the code columns in the next and adjacent area, control means associated with said auxiliary memory means and the switching means of a predetermined area for maintaining said same switching means operative for read-out by said ring chain of only the electrical signals from said memory means associated with the first code column of said predetermined area to restrict the total number of characters to not more than said predetermined number, said control means being responsive to the signals read into said auxiliary memory means for counting said signals and, upon reaching a predetermined count indicative that the number of characters on the medium is not more than said predetermined number, providing an output pulse for rendering said switching means of said predetermined area operative to permit said ring chain to read-out all of the electrical signals in said memory means associated with the predetermined area, and means responsive to the electrical signals read-out of said memory means for printing characters in accordance therewith.

8. A device for restricting the printing of a plurality of characters greater than a predetermined number to a number of characters not greater than said predetermined number and permitting all of said characters to be printed when the number of characters is equal to and less than said predetermined number, said characters being arranged in groups in adjacent areas of a medium and represented by code arranged in successive columns in each of said areas, comprising means for scanning said medium and delivering output pulses in accordance with the code in each column and individual to the character represented thereby, distribution means for receiving said output pulses and delivering electrical signals representative of the coded character in each of said columns, memory means associated with each code column in each of said areas and connected to said distribution means in a predetermined order for read-out of said electrical signals in said same predetermined order, an auxiliary memory means associated with each of said memory means and only those of each area in which there are to be possible code columns, each of said auxiliary memory means being interconnected to the distribution means associated with the next code column and receiving an electrical signal from said distribution means only when no electrical signal is delivered to its associated memory means, a ring chain having one unit thereof associated with each of said code columns and successively responsive to periodic pulses for read-out of the electrical signals stored in said memory means, a control tube associated with each of said units for normally blocking its respective unit to said periodic pulses, means for providing periodic pulses to said ring chain and to said memory means for initiating read-out of said electrical signals successively from said memory means in a predetermined relation to said electrical signals received from said distribution means and the read-out of any electrical signal in said auxiliary memory means, means for deriving a signal to initiate the first unit in said ring chain, said units thereafter being initiated successively by said periodic pulses and each unit, upon being initiated, rendering the control tube associated with the following unit receptive to the succeeding pulse and resetting the preceding unit, means for switching said ring chain from any unit in one area to a unit thereof associated with one of the code columns in the next and adjacent area, a counter circuit associated with said auxiliary memory means for counting the signals read into said auxiliary memory means by said distribution means and providing an output pulse upon reaching a predetermined count indicative that the number of characters on said medium is not more than said predetermined number, a control circuit associated with the switching means of a predetermined area for maintaining said same switching means operative for read-out by said ring chain of only the electrical signals from said memory means associated with the first code column of said predetermined area to restrict the total number of characters to not more than said predetermined number and responsive to the output signal from said counting circuit for rendering said same switching means operative to permit said ring chain to read-out all of the electrical signals in said memory means associated with the predetermined area, and means responsive to the electrical signals read out of said memory means for printing characters in accordance therewith.

References Cited in the file of this patent

UNITED STATES PATENTS

| | | |
|---|---|---|
| Re. 23,713 | Hunt | Sept. 22, 1953 |
| 2,575,017 | Hunt | Nov. 13, 1951 |